April 1, 1952  R. H. WHITELEY  2,591,222
PILLOW BLOCK BEARING AND MOUNTING THEREFOR
Filed Jan. 25, 1947
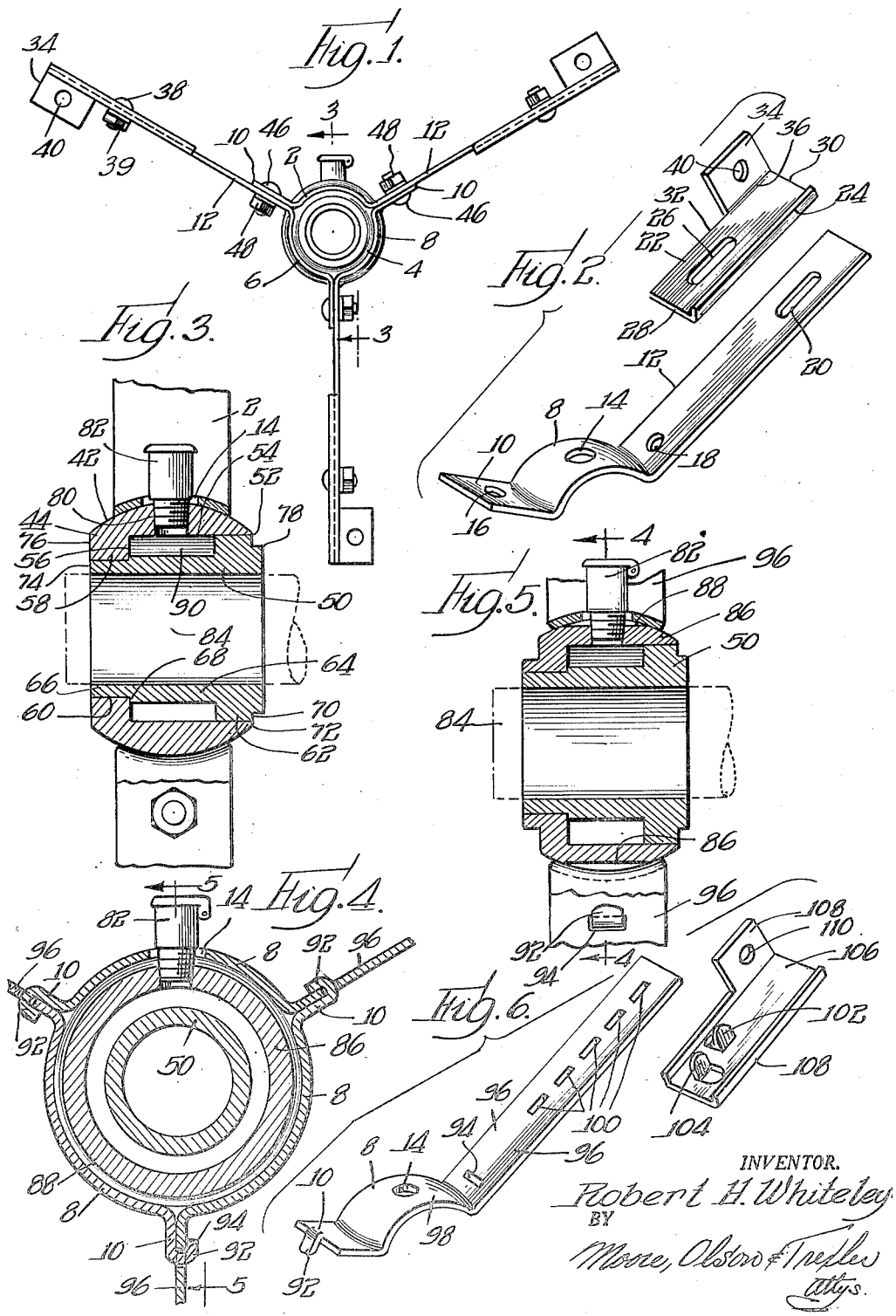
INVENTOR.
Robert H. Whiteley
BY
Moore, Olson & Trexler
attys.

Patented Apr. 1, 1952

2,591,222

UNITED STATES PATENT OFFICE 2,591,222

PILLOW BLOCK BEARING AND MOUNTING THEREFOR

Robert H. Whiteley, Oak Park, Ill., assignor to Randall Graphite Products Corporation, Chicago, Ill., a corporation of Delaware Application January 25, 1947, Serial No. 724,439

4 Claims. (Cl. 308—72)

This invention relates to pillow block bearings and mounting means therefor.

Among the objects of the present invention is to provide an adjustable suspension mounting for a bearing, and particularly for one of the self-aligning type.

Another object of the invention resides in providing a simple and economical type of adjustable suspension mounting for a bearing which will permit its adaptation to blowers and other equipment of varying dimensions so that by merely adjusting the mounting it is adaptable to various sizes of openings, such as blowers and other constructional adaptations.

Yet another object of the invention resides in providing a self-aligning mounting which includes an outer bearing member having arcuate outer wall portions which are shiftably seated in a concave wall portion of a bearing mounting or housing whereby the outer bearing member may be self-aligning, in combination with an inner sleeve member adapted to receive a bearing sleeve in which the rotatable shaft is mounted and wherein the inner bearing sleeve and the outer bearing member are formed with integral cooperating shoulder portions adapted to interfit with complemental portions on each other so as to provide therebetween a relatively wide and relatively shallow lubricant receiving chamber, the construction being arranged such that both the outer bearing member and the inner sleeve may be formed relatively strong and sufficiently thick in dimensions to resist deformation in either the assembly or the operation of the bearing while at the same time providing a lubricant chamber of adequate capacity without adding to the over-all thickness of the bearing in a direction transversely of the central diameter of the shaft.

Another object of the invention resides in providing a self-aligning bearing comprising an annular member having an outer spherical surface whereby the central portion thereof is of increased thickness which is utilized to provide an annular oil chamber of maximum capacity in respect to the over-all size of the parts, in combination with an inner sleeve making a tight fit with the inner wall of the outer bearing member, said two members being provided with spaced apart, inwardly extending, opposed portions cooperating with complemental wall portions formed on the opposite member to provide a relatively wide and shallow lubricant chamber therebetween of maximum capacity with respect to the over-all thickness of the two members whereby the relatively thicker central portion of the outer member is utilized to permit this construction and whereby the use of the one flange on the inner bearing member and the other flange on the outer bearing member permits both parts to have relatively thick wall sections whereby to rigidify the parts and facilitate their machining and press fitting together and whereby there is a minimum danger that either part will be bent out of shape during the pressing operation.

Yet another object of the invention resides in providing a self-aligning bearing of the foregoing type wherein the oil chamber has its major dimension axially of the shaft axis.

Yet another object of the present invention is to provide a bearing of the foregoing character wherein the spherical surface of the outer member is generated around the intersection of the shaft axis and the central plane of the bearing.

Another object of the invention is to provide a construction wherein the outer bearing is provided with an opening into which an oil cup is disposed, the arrangement being such that the stem of the oil cup extends radially away from the stem of the lubricant channel and communicates therewith through an opening or sectional division in the outer housing or support and also through the outer annular member.

These and other objects of the invention will be apparent from a perusal of the following specification when taken in connection with the accompanying drawing, wherein:

Figure 1 is a front elevational view of my improved adjustable mounting, as for instance for a blower or the like, the parts of the blower being shown broken away;

Figure 2 is a perspective view of one of the adjustable members of the mounting;

Figure 3 is a section taken on the line 3—3 of Figure 1;

Figure 4 is a section taken on the line 4—4 of Figure 5, showing a modified form of means for holding the housing sections in clamped position around the outer bearing body;

Figure 5 is a section taken on the line 5—5 of Figure 4; and

Figure 6 is a detailed perspective view showing the parts of the modified form of housing and clamping means.

For purposes of illustration I have shown the adjustable mounting as a three-way suspension pillow block mounting as supporting a self-aligned bearing comprising a ball-shaped annular outer member carrying interiorly a bearing sleeve for rotatably supporting a shaft.

The suspension pillow block in the form illustrated comprises three sheet metal identical hanger straps 2, 4 and 6 which are united in the manner shown in Figure 1 to interconnectedly form a complete circular housing or support within which the outer spherical member may align itself. As shown best in Figure 2, each of the straps comprises an arcuate portion 8 having an integral, angularly disposed tab-like end 10 at one end, and a longer leg portion 12 integrally united at the other end. Each of these strap-like members are preferably formed of relatively heavy gauge strap metal, and preferably but not necessarily, each one is, or may be, formed with an opening 14 through which the stem of the lubricant cup passes as hereinafter referred to. If desired, only one of the strap members may have this opening 14 which is placed centrally of the arcuate portion 8. The tab of the strap 10 is provided with a fastener opening 16 and the portion of the long leg 12 of the strap adjacent its junction with the arcuate portion 8 is provided with an additional fastener opening 18. At its outer end this leg 12 is provided with an elongated slot 20. Cooperating with the leg portion 12, each leg has an adjustable extension leg or strap element 22 which is provided along one longitudinal edge with an upstanding flange 24 preferably disposed at right angles to the plane of the leg. The strap extension 22 is likewise provided with an elongated slot 26 which is located substantially intermediate the two longitudinal edges of this strap extension 22 and preferably nearer the end 28 than it is to the opposite end 30. At this opposite end 30 the strap extension 22 along the longitudinal edge 32 is provided with a laterally extending tab 34 which extends outwardly at right angles to the plane of the leg 22. The distance between the edge 36 and the inner wall of the flange 24 is arranged such that the leg member 12 will fit snugly therein so that the base of the tab 34 and the right angle flange 24 will act as a guideway for holding the members 12 and 22 so that the member 22 will slide and maintain parallel relation along the strip 12 for adjustment. A bolt 38 passes through the registering slots 20 and 26 and receives a nut 39 on its threaded end, which nut, when tightened, serves to provide means for holding the extension 22 in any desired adjustment corresponding to the length of the slots 20 and 26. The tab 34 is provided with a fastener opening 40.

In cross section, in a direction transversely of its length, the arcuate portion 8 is curved arcuately as shown in Figure 3 to conform to the curved wall portion 42 of the annular body member 44.

The three sections identical with the longer one shown in Figure 2 are assembled in the manner shown in Figure 1 wherein the shorter tab 10 of the section 8 of one of these members is aligned with the inner portion of the leg 12 of the next connecting member in such a manner that the aperture 16 of the tab end 10 will register with the aperture 18 of the leg 12 of the next adjacent member; and a bolt 46 passes through these aligned openings and receives a nut 48 whereby they are clampingly held in position. In the same manner the opposite tab end 10 of the last mentioned leg portion 12 is lined up with the next mentioned portion 12 and secured thereto by means of a bolt 46 and an additional nut 48. As shown in Figure 1, these three different elongated sections having the tab 10, the curved or arcuate portion 8, and the leg portion 12, are interconnected in the foregoing manner to make a circular closed housing surrounding the correspondingly curved outer wall 42 of the bearing member 44, and since the three curved strap portions 8 form a continuous circular housing about the annular arcuate wall 42 of the enclosed bearing, the bearing member 44 may align itself in this strap-like housing. It is understood that instead of the housing shown in Figure 1 I may utilize the type of housing shown in my prior Patent 2,123,872, issued July 19, 1938, or that of the pending application of Kenneth E. Whiteley, Serial No. 475,345, filed February 10, 1943.

The ears 34, as shown in Figure 1, are attachable to the metal work of the housing surrounding the blower opening. If the blower opening be larger or smaller, the leg portions of the mounting may be lengthened or shortened by adjusting the extensions 22 with respect to the legs through the intermediary of the slotted portions 20 and 26 and the nut and bolt 38 and 39.

One of the important aspects of the present invention resides in the manner of constructing the inner annular wall of the annular body member 44 and the outer wall of the sleeve 50. This sleeve is adapted rotatably to house the shaft that is rotatably supported by the bearing, and the sleeve itself in so far as transmitting lubricant to the shaft itself, may be formed in various ways as suggested in the prior mentioned patent or the prior mentioned application, or it may be formed in any desired manner that will transmit lubricant from the lubricating channel, to be described, to the shaft rotating within the sleeve 50. One of the aspects of the present invention is directed to the manner in which a lubricating chamber is formed between the outer annular ring-like body member 44 and the outer surface of the bearing sleeve 50. The outer annular body member 44 is preferably cut away annularly from a point such as 52 at one end of the bearing along the line 54 through the line 56 whereby to provide an annular, inwardly projecting flange 58 which terminates at the annular machined surface 60. This structure just described may be either machined, cast, or die cast with this interior annular conformation, and is preferably formed of steel. This spherical bearing is preferably die cast.

Cooperating with this ball or spherically formed outer member is a bushing or sleeve 50 which may be formed of bronze or any other desired material. It is formed at one end with an outwardly projecting annular flange 62 and laterally of said annular flange the sleeve is provided with an annular portion 64 of less diameter.

Preferably the outer end of this annular portion 64 is machined to a smaller dimension as shown at 66 to provide an annular shoulder 68. The first mentioned end of the sleeve is preferably chamfered as at 70 so that the edge 72 registers with the annular edge 52 of the outer ball member 44. In a similar manner the outer annular edge 74 of the bearing sleeve 50 registers with the end wall 76 of the ball member 44. When the flanged bushing is assembled within the bearing member 44 as shown in Figure 3, the shoulder 68 will contact the annular wall 56 of the outer member to guide and maintain the registration of the edges 70 and 74 with the lateral edges of the outer ball member 44 and there will be a tight fit between the annular walls of the inner and outer members 44 and 50 which will preclude the passing of lubricant therethrough. If desired, the flanged bushing may be formed with the member 64 of uniform dimension from the shoulder 78 completely to the end wall 74 of this member so that the shoulder 68 will not be formed. In short, the shoulder 68 is not an essential formation of the construction but is used in some instances to assist in maintaining the walls 56 and 78 in definite spaced relation one from the other, whereby to form a lubricant chamber therebetween. If desired, the sleeve 50 may be cast and certain of the faces which are to make a tight fit with certain of the inner walls of the member 44 may be machined to ensure this tight fit.

Preferably the central portion of the circular sleeve-like housing 44 is provided with an opening 80 which may be threaded to receive the threaded stem of a lubricant cup 82 or may be left unthreaded to have the stem of the lubricant cup making a tight fit therewith. The lubricant cup 82 is shown as passing through the opening 14 of the strap member whereby the lubricant cup is centralized with respect to its surrounding housing. The shaft 84 is shown as being rotatably mounted in the bearing sleeve 50.

The construction in Figure 5 is identical with that of Figure 3 except that the central portion of the annular outer wall of the member 86 that corresponds to the member 44 of Figure 3 is provided with a centrally disposed annular flat wall portion 88 instead of being formed in the manner shown in Figure 3.

It will thus be seen that I have provided, by means of the construction of the internal annular walls of the member 44 and the external annular walls of the sleeve 50, an annular lubricant channel or chamber 90 as shown in Figures 3 and 4, which annular chamber in a direction parallel with the axis of the shaft 84 is elongated and in a transverse direction is annularly relatively shallow, whereby the over-all thickness of the bearing is not increased and whereby also due to the outer spherical surface on the outer annular member 44 the central portion of the wall structure of such member assumes an increased thickness. This thickness is utilized to permit this annular oil chamber 90 to have a larger size in respect to the over-all size of the parts. Thus this relation between the placement of the annular oil chamber 90 and the fact that the outer member 44 has a spherical surface establishes definite structural and novel relation between the member 44 as thus constructed and the construction of the outer wall of the inner sleeve member 50 to provide this chamber. Furthermore, by constructing the bearing sleeve 50 with the annular outer projecting flange 62 at one end thereof and the outer member 44 with an inwardly extending annular flange at the opposite end thereof as located in Figure 3, when assembled it permits both parts to have at least one relatively thick wall section which tends to rigidify the parts, facilitate their casting, and facilitate their press fitting together because there is a minimum danger that either part will be bent out of shape during the pressing operation. Thus the present structure provides a most beneficial manner of constructing these parts to provide the annular lubricant chamber of maximum capacity without altering the over-all size of the bearing and with minimum decrease in the strength of the wall members of the bearing for assembly and operation. In short, I take advantage of the spherical outer surface of the outer member to give this increased wall section at the central portion thereof to arrange for the inwardly extending flange 76 and the intervening lubricant chamber 90 of annular, relatively elongated construction with respect to the axis of the shaft 84. It will be noticed that the oil chamber 90 has its major dimension axially of the shaft 84. It will also be noticed that by means of this construction the spherical surface 42 is generated around the inner section of the shaft axis and the central plane of the bearing, such as the locus 84. It is further to be noted that by means of this construction there is provided a lubricant-containing bearing which permits the oil cup 82 to have its stem disposed in the opening 80 of the bearing, preferably centrally thereof, and as so located this oil cup is in position to pass out to an opening 14 in the housing portion 8 so that the oil may be filled by lifting the cover of the oil cup 80. Hence oil will pass directly into the chamber 90. In the constructions wherein this novel type of lubricated bearing is applied to the housing construction of my aforesaid prior Patent 2,123,872 and the pending application of Kenneth E. Whiteley Serial No. 475,345, filed February 10, 1943, now abandoned, the stem of the lubricating chamber will be located in the manner set forth in said disclosures.

This type of novel bearing may also be applied to a housing construction as set forth in an application of mine showing the two-piece housing structure, which subject matter is carved out of subject matter shown but not claimed in my prior application Serial No. 759,843, filed December 31, 1934, and issued as Patent 2,086,787, of July 13, 1937, and in Kenneth E. Whiteley application Serial No. 415,156, filed October 16, 1941 and issued as Patent 2,350,845, of June 6, 1944, and in the pending application of Kenneth E. Whiteley Serial No. 475,345, filed February 10, 1943, now abandoned, wherein the ball member is die cast and provided with an integral die cast lubricant cup.

With respect to the modification shown in Figures 4, 5 and 6, the strap portion, instead of being formed in the manner shown in Figure 2, is provided at the tab end 10 thereof with an integral bent ear 92 which is adapted to enter a slot such as 94 that is formed at the base of the longer tongue 96, adjacent the arcuately formed portion 98 thereof. It is understood that the ear 92 enters the perforation 94 of the next adjacent leg member 96. In this modification also the leg member 96 is provided with a series of spaced apart adjustment slots 100 along its length which cooperate with bendable tongues 102 and 104 formed in the extension 106 by slotting and bending the metal thereof. This extension 106 is provided, just as in the extension 22, with the right angled flange 108 corresponding to the flange 24 of Figure 2 and with the lateral parallel extending tab 108 corresponding to the tab or ear 34 of Figure 2. This ear is provided with a perforation 110. The flanges 108 slidingly hold the extension 106 to the leg member 96 and the bendable ears 102 and 104 enter the notches 100 to provide the adjustment. After suitable adjustment is made, the ears may be bent over to hold the same in fixed position or may be welded in such position, if desired.

Obviously the invention is not limited to the specific details of construction disclosed herein but is capable of other modifications and changes without departing from the spirit and scope of the appended claims.

Having thus described my invention, what is claimed as new and desired to be secured by Letters Patent is:

1. In combination with an annular housing having a curved interior wall portion, a metallic annular bearing member having an outer wall portion curved in a direction parallel with the central axis of the annular housing, said annular bearing member having at one end or face thereof an inwardly projecting annular flange providing a shoulder extending in a direction transverse to the central axis of said annular bearing member, and a bearing sleeve adapted to fit within said annular bearing member, said bearing sleeve having an external, outwardly extending flange adapted to make a tight fit within that annular inner wall of the annular bearing member that is opposite the inwardly projecting flange of said annular bearing member, the opposite end of said inner bearing sleeve making a tight fit with the inner annular wall of the inwardly projecting flange of said annular bearing member whereby to provide an annular lubricant chamber therebetween which lubricant chamber has its major axis extending in a direction parallel with the central axis of the inner bearing sleeve, the outer wall of said bearing sleeve adjacent the inwardly projecting flange on said annular bearing member being recessed to provide a shoulder, said last mentioned inwardly projecting flange being positioned in abutting relationship against said last mentioned shoulder to position said annular bearing member and said bearing sleeve in a fixed manner with respect to each other.

2. A bearing structure comprising an outer annular body member, said outer member having at one end thereof an inwardly projecting annular flange extending in a direction transverse to the central axis of said outer member, and a bearing sleeve adapted to fit within said outer member, one end of said bearing sleeve being recessed on the external surface thereof to provide a recessed portion and shoulder adapted to receive the inwardly projecting annular flange on said outer member, the engagement between said shoulder and the inwardly projecting annular flange on said outer member serving to fixedly position said outer member with respect to said bearing sleeve, said sleeve having an external outwardly extending flange adapted to make a tight fit within the inner wall of said outer member adjacent the end opposite the inwardly projecting flange of said outer member, the opposite end of said inner bearing sleeve making a tight fit with the inner annular wall of the inwardly projecting flange of said outer member whereby to provide an annular lubricant chamber between said flanges.

3. A bearing structure comprising an outer annular body member, said outer member having at one end thereof an inwardly projecting annular flange extending in a direction transverse to the central axis of said outer member, and a bearing sleeve adapted to fit within said outer member, one end of said bearing sleeve being recessed on the external surface thereof to provide a recessed portion and shoulder adapted to receive the inwardly projecting annular flange on said outer member, the engagement between said shoulder and the inwardly projecting annular flange on said outer member serving to fixedly position said outer member with respect to said bearing sleeve, said sleeve having an external outwardly extending flange adapted to make a tight fit within the inner wall of said outer member adjacent the end opposite the inwardly projecting flange of said outer member, the opposite end of said inner bearing sleeve making a tight fit with the inner annular wall of the inwardly projecting flange of said outer member, said flanges cooperating to form an annular lubricant chamber having its major dimension disposed axially of said outer member, the major dimension of said lubricant chamber being greater than the axially extending dimension of each of said flanges.

4. A bearing structure comprising an outer annular body member having an outer wall portion curved in a direction parallel with the central axis of said outer member, said outer member having at one end thereof an inwardly projecting annular flange extending in a direction transverse to the central axis of said outer member, and a bearing sleeve adapted to fit within said outer member, one end of said bearing sleeve being recessed on the external surface thereof to provide a recessed portion and shoulder adapted to receive the inwardly projecting annular flange on said outer member, the engagement between said shoulder and the inwardly projecting annular flange on said outer member serving to fixedly position said outer member with respect to said bearing sleeve, said sleeve having an external outwardly extending flange adapted to make a tight fit within the inner wall of said outer member adjacent the end opposite the inwardly projecting flange of said outer member, the opposite end of said inner bearing sleeve making a tight fit with the inner annular wall of the inwardly projecting flange of said outer member whereby to provide an annular lubricant chamber between said flanges.

ROBERT H. WHITELEY.

REFERENCES CITED

The following references are of record in the file of this patent:

UNITED STATES PATENTS

| Number | Name | Date |
|---|---|---|
| 1,212,474 | Gale | Jan. 16, 1917 |
| 1,283,406 | Gade | Oct. 29, 1918 |
| 2,035,519 | Apple | Mar. 31, 1936 |
| 2,048,763 | Whiteley | July 28, 1936 |
| 2,086,787 | Whiteley | July 13, 1937 |
| 2,123,872 | Whiteley | July 19, 1938 |
| 2,138,659 | Kindig | Nov. 29, 1938 |
| 2,479,791 | Strunk | Aug. 23, 1949 |